United States Patent [19]

Kalns

[11] Patent Number: 4,702,125
[45] Date of Patent: Oct. 27, 1987

[54] HIGH REDUCTION TRANSAXLE FOR ELECTRIC VEHICLE

[75] Inventor: Ilmars Kalns, Plymouth, Mich.

[73] Assignee: Eaton Corporation, Cleveland, Ohio

[21] Appl. No.: 695,767

[22] Filed: Jan. 28, 1985

[51] Int. Cl.⁴ .............................................. F16H 37/08
[52] U.S. Cl. .......................................... 74/695; 74/768
[58] Field of Search .................... 74/695, 665 F, 694, 74/750 R, 764, 763, 768, 769, 701, 751, 785

[56] References Cited

U.S. PATENT DOCUMENTS

| | | | |
|---|---|---|---|
| 3,815,445 | 6/1974 | Gorrell et al. | 74/764 X |
| 3,863,524 | 2/1975 | Mori et al. | 74/765 |
| 4,056,988 | 11/1977 | Kubo et al. | 74/695 |
| 4,296,650 | 10/1981 | Kalns | 74/751 |
| 4,434,680 | 3/1984 | Riediger et al. | 74/714 X |
| 4,479,404 | 10/1984 | Stockton | 74/695 |
| 4,509,389 | 4/1985 | Vahratian et al. | 74/695 |
| 4,528,869 | 7/1985 | Kubo et al. | 74/695 |

OTHER PUBLICATIONS

"A State of the Art DC Propulsion System", Electric Vehicle Council, Kelledes, W., 10/4/83.

Primary Examiner—Leslie Braun
Assistant Examiner—David Novais
Attorney, Agent, or Firm—D. A. Rowe; P. S. Rulon

[57] ABSTRACT

A drivetrain (12) includes a transaxle assembly (16) for driving ground engaging wheels of a land vehicle powered by an AC motor. The transaxle includes a ratio change section having planetary gear sets (24, 26) and brake assemblies (28, 30). Sun gears (60, 62) of the gear sets are directly and continuously connected to an input drive shaft (38) driven by the motor. A first drive (78a) directly and continuously connects a planetary gear carrier (78) of gear sets (24) with a ring gear (68) of gear set (26). A second drive (80a) directly and continuously connects a planetary gear carrier (80) of gear set (26) with a sun gear (64) of a final speed reduction gear set (34) having a planetary gear carrier directly and continuously connected to a differential (22). Brakes (28, 30) are selectively engageable to respectively ground a ring gear 66 of gear set 24 and ring gear 68 of gear set 26.

6 Claims, 4 Drawing Figures

HIGH REDUCTION TRANSAXLE FOR ELECTRIC VEHICLE

GOVERNMENT RIGHTS STATEMENT

The U.S. Government has rights in this invention pursuant to Contracts No. DE-AC08-84NV10366 and DE-AC08-81NV10320, awarded by the U.S. Department of Energy.

FIELD OF THE INVENTION

This invention relates to a planetary gear transmission and, in particular, to such a transmission providing plural speed ratios for an electrically powered vehicle.

BACKGROUND OF THE INVENTION

Automatic, step ratio change transmissions having plural planetary gear sets providing a plurality of speed ratios are well known. Vehicle drivetrains powered by internal combustion engine type prime movers have long employed such transmissions and, of late, as disclosed in U.S. Pat. No. 4,296,650, such transmissions have been proposed for drivetrains powered by electric motor type prime movers of the AC and DC type. Such transmissions, when powered by either type of prime mover, improve vehicle driveability and drivetrain efficiency. Vehicle driveability is affected by many factors. Three important driveability factors are transmission shift quality, vehicle gradability, and vehicle acceleration. Driveability and efficiency improvements are, of course, directly related to efficiency of the transmission, ratio coverage of the transmission, size of the ratio steps, and shift schedule of the ratio step changes. Transmission efficiency is improved by minimizing gear meshes and spin speeds, by minimizing rotating clutches and clutch spin speeds, by avoiding power recirculation within the qeartrain, and by providing ratio steps which allow the electric motor to operate most of the time in its most efficient speed range.

Avoidance of power recirculation within the transmission reduces geartrain power requirements and therefore minimizes the design size of many transmission components such as gears, shafts, clutches/brakes, bearings, etc.

It is also known to employ relatively high speed AC motors as prime movers in vehicle drive-trains. Such motors are durable and substantially maintenance free. Further, the power density and efficiency of such motors are relatively high when they are properly designed and controlled. Such motors may operate at about 10,000 RPM and their torque/speed characteristics require at least a two-speed transmission with a shiftable ratio step of around 2:1 and a larqe overall speed reduction. Such a ratio step is not readily available from known simple planetary gear sets. More complex qear sets such as the Ravigneaux or Simpson gear sets have been proposed. These, however, have the disadvantages of relatively low overall speed reductions, complex componetry, and rotating clutches. Hence, they require additional speed reduction which adds to complexity and cost and which further reduces efficiency.

SUMMARY OF THE INVENTION

An object of this invention is to provide a drivetrain assembly including a simple and efficient planetary gear transmission having a high overall speed reduction and speed ratio steps which allow a prime mover powering the transmission to operate most of the time in its most efficient speed range.

Another object of this invention is to provide a transmission according to the above object which maximizes prime mover power availability to the drivetrain over the operational speed range of a vehicle powered by the drivetrain.

According to a feature of the invention, a drivetrain assembly includes a prime mover having an output shaft and a transmission operative to provide at least first and second speed ratios between input and output drives via first and second planetary gear sets respectively including first and second sun gears, first and second ring gears, and first and second sets of planetary gears in continuous mesh with their associated sun and ring gears and respectively carried by first and second planet carriers. The improvement comprises drive means including the input drive continuously interconnecting the prime mover output shaft with the first and second sun gears and driving the first and second sun gears at the same speed, a first drive continuously interconnecting the second carrier with the output drive; and first and second brakes respectively operative when engaged to prevent rotation of the first and second ring gears, the transmission being operative to provide the first speed ratio when the first brake is disengaged and the second brake is engaged, and the transmission being operative to provide the second speed ratio when the first brake is engaged and the second brake is disengaged.

BRIEF DESCRIPTION OF THE DRAWINGS

The drivetrain of the present invention is shown in the accompanying drawing in which.

DETAILED DESCRIPTION OF THE DRAWING

Figure 1:
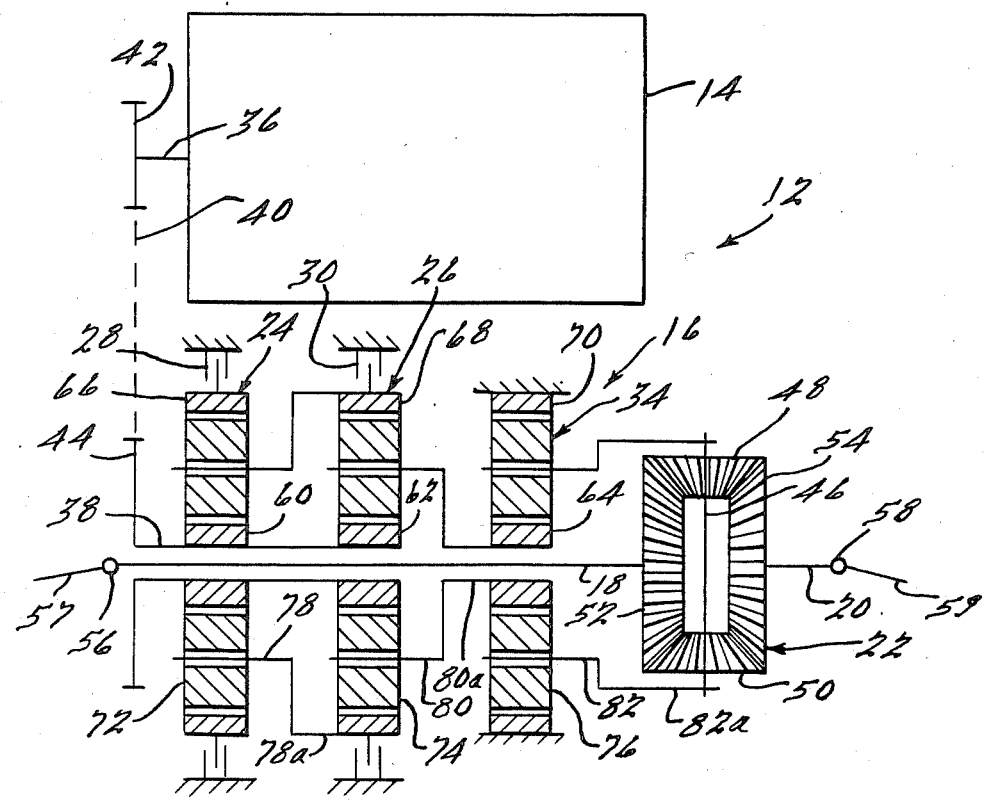
FIG. 1 schematically illustrates a transaxle driven by an electric motor.

FIG. 1 schematically illustrates a drivetrain assembly 12 for powering the wheels of an unshown vehicle. The assembly may power the front wheels of the vehicle and/or the rear wheels. Details of the vehicle and the drivinq connections to the wheels are not shown since such details are, in general, well-known and form no part of the present invention. The drive assembly 12 includes a prime mover 14 and a transaxle assembly 16. The transaxle includes final drive or stub shafts 18, 20 driven by a differential 22.

The prime mover 14, as illustrated herein, is an electric motor driven by a source of electric energy regulated by a control system. The source and control system are both unshown, and neither forms a part of the present invention. Motor 14 need not be an electric motor; however, it is preferably an electric motor of the AC type.

Transaxle 16, as illustrated in FIG. 1, provides two speed ratios in both forward and reverse. The transaxle components are concentric to a common axis defined along the rotational axis of the differential stub shaft 18. Additional speed ratios are believed to be within the spirit of the invention and are readily added by the addition of components, such as the clutch in FIG. 3. The control system, as contemplated, effects motor rotation in one direction to the transmission for forward vehicle motion and in the other direction for reverse vehicle motion.

The transaxle includes planetary gear sets 24 and 26, high and low speed ratio brake assemblies 28 and 30, a planetary speed reduction gear set 34, and the differential 22. The transaxle may be supported within a housing (not shown) similar to the housing disclosed in U.S. Pat. No. 4,296,650 wherein the differential is spaced from the centerline of the planetary gear sets or as shown herein with the differential disposed on the centerline. Further, the housing of motor 14 may be secured to the tranaxle housing in the same manner as disclosed in the above patent. Likewise, an output shaft 36 of motor 14 may be drivingly connected to an input shaft 38 of the transaxle by a chain drive 40 as disclosed in the above patent and illustrated herein as a broken line. Chain 40 runs on a sprocket 42 splined to motor shaft 36 and on a sprocket 44 splined to input shaft 38.

Differential 22, which may be of several well-known designs, includes a pinion shaft 46, a pair of pinion gears 48, 50 journaled on the pinion shaft, and a pair of side gears 52, 54 in constant mesh with the pinion gears. The side gears are splined to the differential output or stub shafts 18, 20 and the stub shafts are adapted to drive vehicle wheels via universal joints 56, 58 and partially shown half shafts 57, 59.

Planetary gear sets 24, 26, 34 are disposed concentric to the axis of shaft 18 and are of the three-element type which preferably have helical gear teeth. The gear sets respectively include sun gears 60, 62, 64 disposed for rotation about the axis of shaft 18, ring gears 66, 68, 70, and a plurality of planetary gears 72, 74, 76 in continuous mesh with their associated sun and ring gears. Sun gears 60, 62 are directly and continuously connected to input drive shaft 38 and are both rotatably driven at the same speed by motor 14. Ring gears 66, 68 are selectively connectable to ground via brakes 28, 30, respectively. Ring gear 70 is permanently fixed to ground. Brakes 28, 30 may be of any conventional design, such as the disc type as illustrated herein or of the band type. The brakes, preferably, are actuated by hydraulic fluid. Planetary gears 72 are supported for rotation about their own axes and the axis of shaft 18 by a planet carrier 78 having a sleeve or quill shaft type extension 78a fixed directly to ring gear 68 and defining a first drive. Planetary gears 74 are supported for rotation about their own axes and the axis of shaft 18 by a planet carrier 80 having a sleeve or quill shaft type extension 80a fixed directly to sun gear 64 and defining a second drive. Planetary gears 76 are supported for rotation about their own axes and the axis of shaft 18 by a planet carrier 82 having a sleeve or quill shaft type extension 82a fixed directly to pinion shaft 46 of differential 22. Input drive shaft 38 and first and second sleeve shafts 78a, 80a comprise a drive means which continuously interconnects the gear sets.

Low-speed friction brake 30 is operative, when selectively engaged, to ground or prevent rotation of ring gear 68 and effect a low or first-speed ratio to second drive 80 of $(R_1/S_1)+1$, where $R_1$ = the number of teeth on ring gear 68 and
$S_1$ = the number of teeth on sun gear 62

Hiqh-speed brake 28 is disengaged while low-speed brake 30 is engaged.

High speed friction brake 28 is operative, when selectively engaged, to ground or prevent rotation of ring gear 66 and effect a high or first-speed ratio to second drive 80 of $[2(S_2+P_2)]/[(R_2+S_1)/2(S_1+P_1+S_2]$, where $P_1$ = the number of teeth on planet gear 74,
$R_2$ = the number of teeth on ring gear 66,
$S_2$ = the number of teeth on sun gear 60, and
$P_2$ = the number of teeth on each planet gear 72.

Low-speed brake 30 is disengaged while high-speed brake 28 is engaged.

A final speed reduction to differential 22 is provided by planetary gear set 34 which is also of the three element type including the sun gear 64 directly and continuously connected to second drive 80, the ring gear 70 fixed against rotation, and the plurality of pinion gears 76 in constant mesh with the sun and ring gears and rotatably supported by the planet carrier 82 directly and continuously connected to pinion shaft 46 of differential 22.

By way of example only, the number of teeth on the gears of gear sets 24, 26 may be as follows:

| | |
|---|---|
| Sun gear$_1$ | 62 = 42 teeth |
| Ring gear$_1$ | 68 = 70 teeth, |
| Planet gears$_1$ | 74 = 14 teeth, |
| Sun gear$_2$ | 60 = 30 teeth, |
| Ring gear$_2$ | 66 = 62 teeth, and |
| Planet gear$_2$ | 72 = 16 teeth |

Chain drive 40, 42, 44 provides a 2.23:1 speed reduction.

With the above tooth arrangement, gear sets 24, 26 provide the following ratios and % step change:

| | Ratio | Step |
|---|---|---|
| Low-Speed | 3.067:1 | 75.3% |
| High-Speed | 1.728:1 | |

The overall speed reduction ratio in low-speed is 20.9:1 and 12:11 in high speed.

Figure 2:
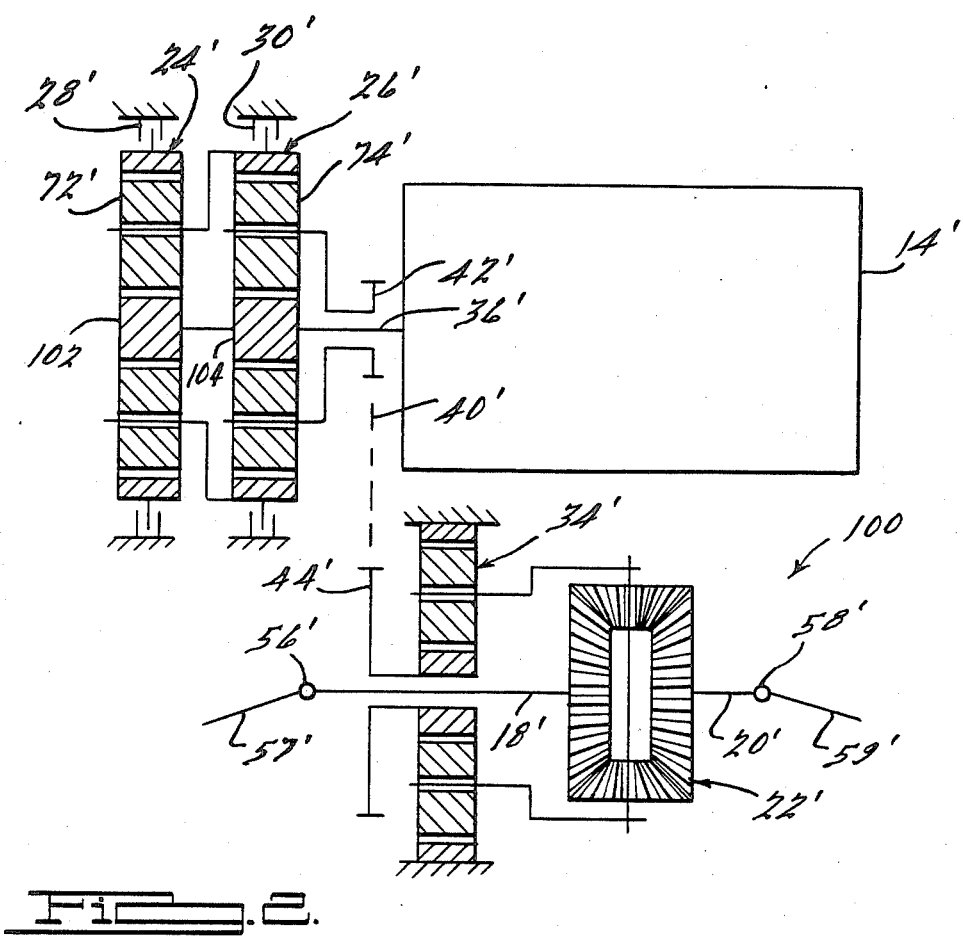
FIG. 2 schematically illustrates an alternative embodiment of the transaxle in FIG. 1.

Looking now at the alternate drivetrain embodiment 100 of FIG. 2, therein elements substantially the same as elements of FIG. 1 are given the same reference number suffixed with a prime. In the drivetrain of FIG. 2, shiftable gear sets 24', 26' are axially aligned with output shaft 36' of electric motor 14'. This arrangement negates the need for hollow sun gears, as in FIG. 1 wherein shaft 18 passes through sun gears 60, 62. Hence, sun gears 102, 104 which are respectively analogous to sun gears 60, 62 may be made smaller in diameter with several resultant advantages. The speed reduction and ratio step size of gear sets 24', 26' may be increased to thereby increase the overall speed reduction of the drivetrain and to reduce the speed reduction necessarily provided by the chain drive 42', 40', 44' and/or the speed reduction of gear set 34'. The arrangement of FIG. 2 also permits longer axle half shafts 57', 59' and thus smaller u-joint angles with resultant improved durability of the u-joints and reduced vibration of the u-joints.

Figure 3:
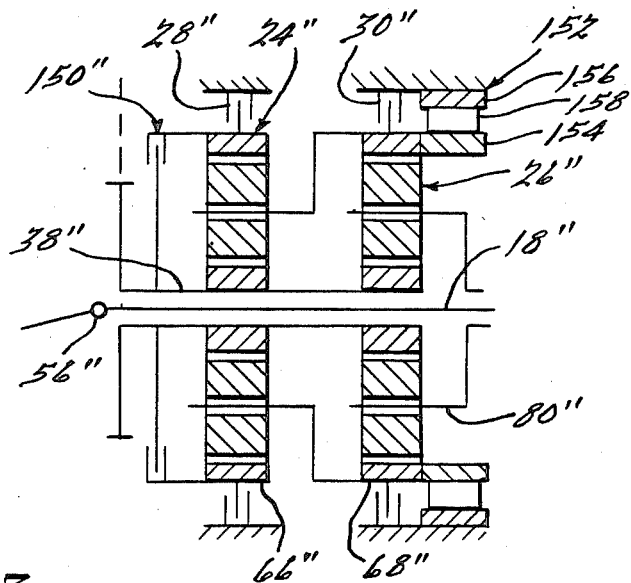
FIGS. 3 and 4 illustrate modifications of the embodiments in FIGS. 1 and 2.

Looking now at the modification of FIG. 3, therein elements substantially the same as elements of FIG. 1 are given the same reference number suffixed with a double prime. The modification of FIG. 3 applies to both FIGS. 1 and 2 and thereto a friction clutch 150 and/or a one-way roller brake 152. The friction clutch 150 provides the transaxle with an additional high or third speed ratio. Clutch 150 is operative when selectively engaged to connect ring gear 66" to input drive 38", thereby locking gear sets 24", 26" and effecting a 1:1 speed ratio to second drive 80". One-way brake 152 includes an inner race 154 fixed to ring gear 68", an outer race 156 fixed to ground, and a plurality of rollers 158. One-way brake 152 self-engages to provide the first-speed ratio in response to forward rotation of input shaft 38" when brake 28", 30" and clutch 150 are disengaged. One-way brake 152 overruns when input shaft 38" rotates in the reverse direction, and torque is from motor 14". One-way brake 152 also overruns when input shaft 38 rotates in the forward direction, and torque is to motor 14". One-way brake 152 is not necessary for operation of transaxle 16 but is preferred in some installations, since it simplifies first-second and second-first shift control and since it will engage the first speed ratio to provide a so-called come-home gear in the event of transmission control system failure. Motor 14" may function as a generator when it is driven by the transaxle to provide reqenerative braking. Regenerative braking during forward vehicle motion requires engagement of brake 30".

Figure 4:
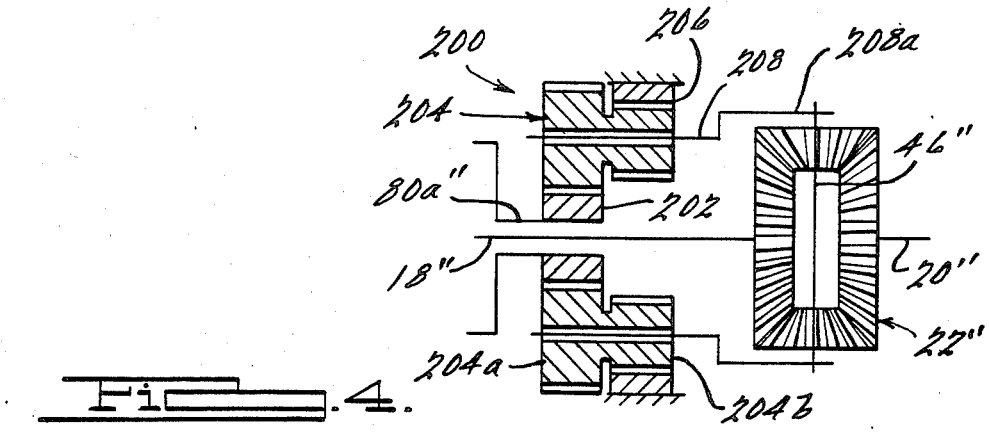

In the modification of FIG. 4, elements substantially the same as elements of FIG. 1 are given the same reference number suffixed with a double prime as in FIG. 3. The modification of FIG. 4, like the modification of FIG. 3, applies to both FIGS. 1 and 2. In FIG. 4 the simple speed reducer 34 of FIG. 1 is replaced by a compound speed reducer 200 to increase speed reduction without increasing the diameter of the speed reducer. Speed reducer 200 includes a sun gear 202 fixed to second drive 80a", a plurality of stepped planetary gears 204 each having a large diameter planetary gear portion 204a and a reduced diameter planetary gear portion 204b, and a ring gear 206. Planetary gear portions 204a are in continuous mesh with sun 202 and planetary gear portions 204b are in continuous mesh with ring gear 206. Planetary gears 202 are supported for rotation about their own axes and the axis of shaft 18" by a planet carrier 208 having a sleeve or quill shaft type extension 208a affixed directly to pinion shaft 46" of differential 22".

Several embodiments of the invention have been disclosed for illustrative purposes only. Many variations and modifications of the illustrated embodiments are believed to be within the spirit of the invention. The following claims are intended to cover the inventive portions of the several embodiments and variations and modifications within the spirit of the invention.

What is claimed is:

1. In a drivetrain assembly including a prime mover having an output shaft and a transmission operative to provide at least first and second speed ratios between input and output drives via first and second planetary gear sets respectively including first and second sun gears, first and second ring gears, and first and second sets of planet gears in continuous mesh with their associated sun and ring gears and respectively carried by first and second planet carriers; the improvement comprising:

drive means including the input drive continuously interconnecting the prime mover output shaft with the first and second sun gears and driving the first and second sun gears at the same speed, a first drive continuously interconnecting the second carrier with the first ring gear, and a second drive continuously interconnecting the first carrier with the output drive; and first and second brake means respectively operative when engaged to prevent rotation of the first and second ring gears, the transmission operative to provide the first speed ratio when said first brake is engaged and said second brake is disengaged, and said transmission operative to provide the second speed ratio when said first brake is disengaged and said second brake is engaged;

a gear differential driving first and second driveshafts; and a fixed speed reduction gear set interposed between the first planetary carrier and the differential and including a three element planetary gear set having sun, ring and planet gear elements, one of said elements being fixed directly to the first planet carrier by an intermediate drive, a second element, fixed to ground, and the third element being connected directly to the said gear differential.

2. The drivetrain of claim 1, wherein the prime mover is an electric motor.

3. The drivetrain of claim 1, wherein the prime mover is an AC electric motor.

4. The drivetrain of claim 1, wherein the first brake means includes a friction brake selectively engaged to prevent rotation of the first ring gear independent of the direction of rotation of the input drive, and a one-way brake operative to engage and prevent rotation of the first ring gear in response to the input drive being rotated in one direction while the friction brake is disengaged.

5. The drivetrain of claim 1, wherein the gear sets are concentric to the second output shaft, and the input and intermediate drives are quill shafts.

6. The drivetrain of claim 1, further including:
   clutch means operative when enqaged to prevent relative rotation between the second ring and sun gears while the first and second brakes are disengaged for providing a third speed ratio.

* * * * *